Patented June 1, 1948

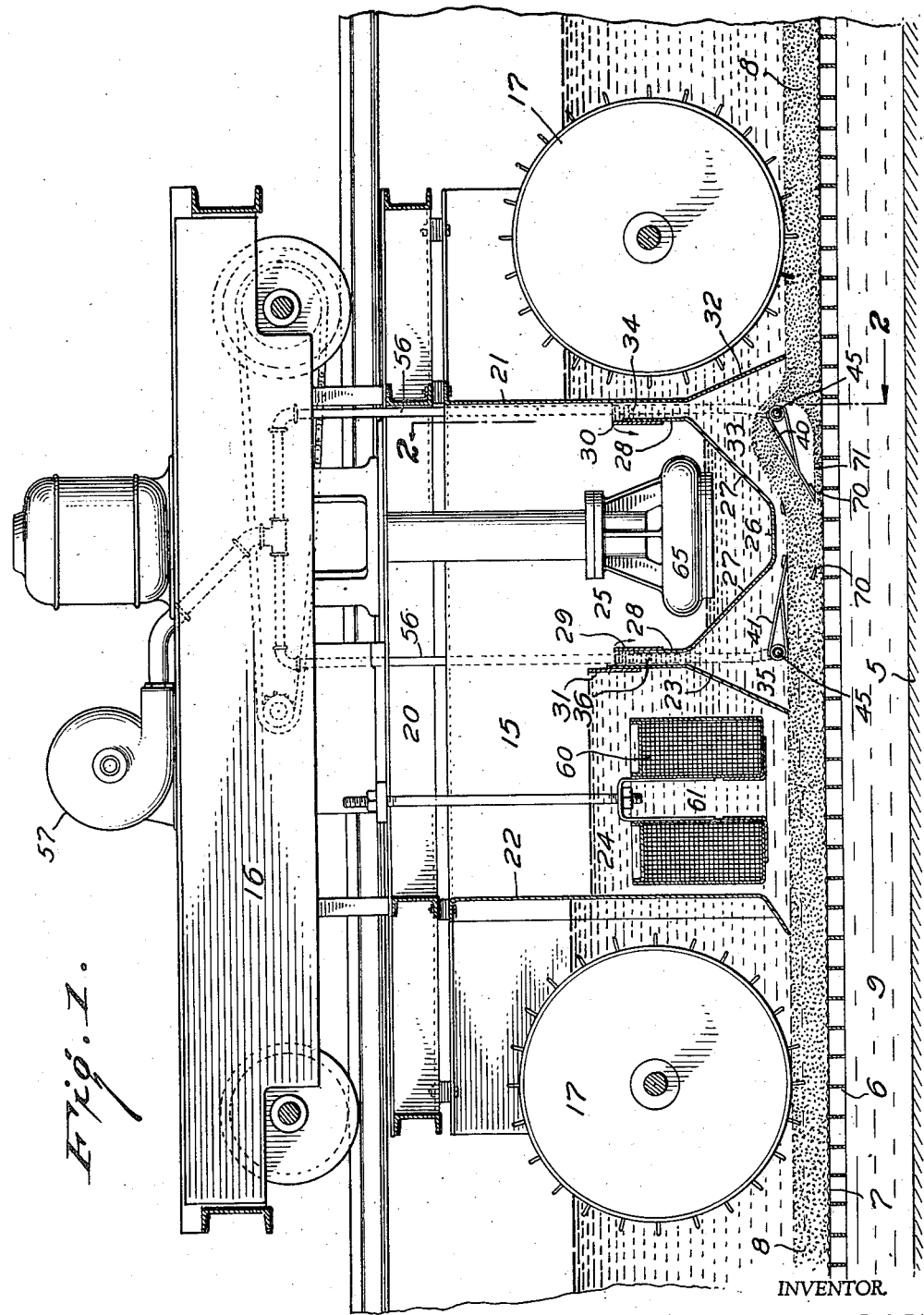

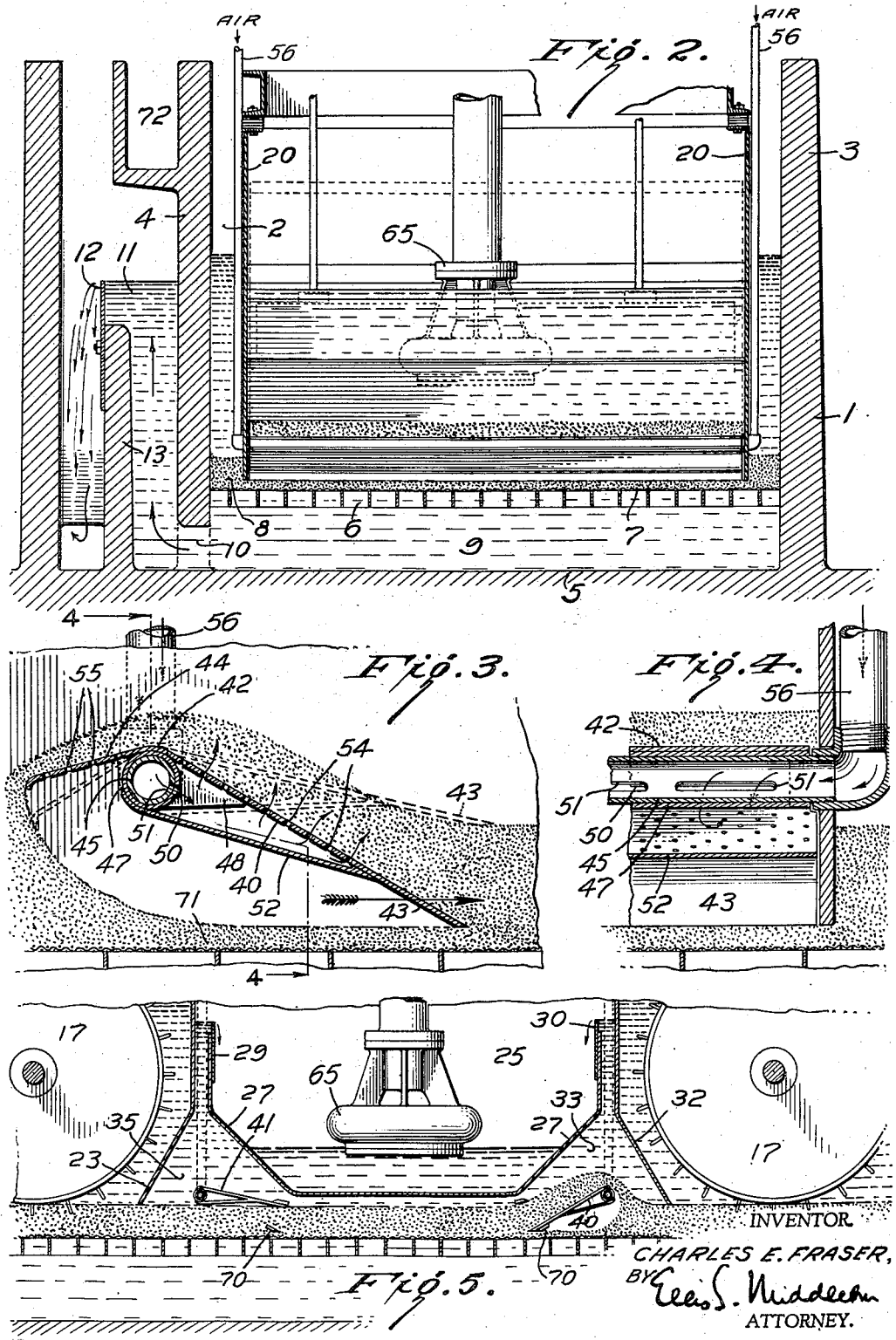

2,442,594

UNITED STATES PATENT OFFICE 2,442,594

PNEUMATIC CLEANER FOR SAND FILTERS

Charles E. Fraser, Kew Gardens, N. Y.

Application April 27, 1938, Serial No. 204,519

6 Claims. (Cl. 210—128)

1

This invention relates to sand filters for the filtration or clarification of municipal water supplies, municipal sewage, industrial wastes, industrial boiler feed water, and in general to the filtration or clarification of any types of water, sewage, or industrial wastes involving relatively high rates of flow. The invention is more particularly concerned with the cleaning of filters of this type.

In the development of modern filters and filtration processes, the advantages of rapid filtration are increasingly evident. Whereas it was formerly the practice to use deep beds of sand or other filtering material which beds were permitted to remain in place until "ripening" occurred, modern developments have proceeded in the direction of relatively thin beds of fine sand or other filtering material with continuous cleaning. These developments have been made possible by improvements in cleaning devices of the type which travel over the surface of the filter bed and continuously or intermittently remove dirt from the filter.

It is an object of the present invention to provide a traveling cleaner of this type which will remove accumulated dirt and impurities with a minimum of disturbance of the filter bed. A further object is to provide a traveling cleaner for relatively thin filters which will separate the sand of the filter into upper and lower layers, and which is capable of more vigorous cleaning of the upper layer if desired. Still another object is the provision of a travelling cleaner having two independent sand agitating devices, one adapted to agitate the sand of the filter throughout its entire depth and the other adapted to agitate only an upper layer of the sand of the filter. A still further object is the provision of a cleaning device of this type adapted to operate on downflow filters having submerged filter beds, where hydrostatic pressure acts to create an upflow of wash water through the filter bed. Still further objects will become apparent from the following description, and will be pointed out in the claims annexed thereto.

Certain representative embodiments of the invention are illustrated in the accompanying drawings in which:

Fig. 1 is a vertical section through a filter and cleaning device embodying the invention;

Fig. 2 is a transverse section on the line 2—2 of Fig. 1 and showing the filter canal, filter and control weir;

Fig. 3 is an enlarged detail of a modified form of the elevating plane or plate which is used to elevate an upper layer of the filter bed;

Fig. 4 is a section on the line 4—4 of Fig. 3; and

Fig. 5 is a vertical section similar to Fig. 1 of a modified form of the invention in which no electromagnet is used.

While the invention is capable of use on both upflow and downflow filters, it is illustrated as being applied to a downflow filter of the submerged type, since this is its most important field of application. The invention is particularly adapted for use on submerged downflow filters having an adjustable control weir which creates a reverse hydrostatic pressure or "back head", as is more fully described in my copending application, Serial No. 152,771, filed July 9, 1937, Patent 2,204,534 granted June 11, 1940, and a filter of this type is illustrated in Figs. 1 and 2 of the drawings.

Referring therefore to these figures, the filter indicated generally by the reference numeral 1 may consist of a filter canal 2 formed between vertical side walls 3 and 4 and a bottom 5 all of concrete or other suitable material. Between the side walls 3 and 4 and some distance above the bottom is a heavy bronze grid 6, which extends between and is supported in the side walls and constitutes a filter support. Upon the grid 6 is a fine screen 7 of bronze or copper which in turn supports a filter bed 8 which may be magnetite sand or other magnetic material of 20–60 mesh in the modification shown. This filter bed may be from 6–12 inches in thickness, although it is an advantage of the invention that it permits the use of much deeper filter beds if desired.

Water or other liquid to be filtered is received into the filter canal 2 from an influence channel providing a substantial head of water to force the liquid through the filter against the back pressure thereof. This channel may be a passage leading from a sedimentation tank, or it may be a portion of the settling tank itself, but in either case, the water is admitted into the filter canal 2 above the filter bed through an inlet passage (not shown) under a sufficient hydrostatic pressure. The space 9 below the filter leads through an outlet 10 into an effluent channel 11 provided with an adjustable control weir 12. The channel 11, although shown as being formed between a side wall 4 of the filter canal and an outer wall 13, may be entirely separate from the structure of the filter and may be some distance removed therefrom. In a downflow filter the important feature of the effluent channel 11 and weir is that they provide a reverse hydrostatic pressure or "back head" which is exerted on the bottom of the filter bed and operates to force wash water therethrough as will be subsequently explained.

A cleaning device adapted to operate in combination with the above described filter is shown in Fig. 1. This cleaner consists generally of a cleaner tank or caisson 15, supported by a travelling carriage 16 and provided with rotary seals 17 as described and claimed in my copending application above referred to.

The cleaner tank 15 is made up of side walls 20 and partitions 21 and 22 which form therewith a tank open at its top and bottom. Between the partitions 21 and 22 is an intermediate partition 23 which extends across the caisson between the side walls 20 and divides it into a solenoid chamber 24 and a pump chamber 25. The bottom of the pump chamber 25 is preferably closed by a continuous bottom plate 26 which has inclined sides 27 and vertical walls 28. The side walls 28 are provided with adjustable weir plates 29 and 30 and a similar weir plate 31 is attached to the upper edge of the intermediate partition 23.

The lower edge of the partition 21 is bent outwardly as at 32, and the generally triangular space between the lower edge of this partition and one inclined side 27 of the bottom plate 26 forms a channel 33 for receiving wash water and air from the filter bed. A similar channel 35 is formed between the lower edge of the intermediate partition 23 and the opposite inclined side 27 of the bottom plate 26. These channels 33 and 35 are in communication with the interior of the pump chamber 25 by way of inlet passages 34 and 36, respectively, which are formed between the vertical side walls 28 of the bottom plate 26 and the partitions 21 and 23. The flow of wash water through these passages is controlled by the adjustable weirs 30 and 29.

On Fig. 1 of the drawings, is shown a preferred type of means for separating the sand of the filter under the caisson into upper and lower layers, in order to provide a more vigorous cleaning of the upper layer if desired. This preferred means comprises plate 40 which is rotatably mounted so that it may plow through the sand of the filter bed when the cleaner is moving in one direction but may ride up over the sand when the direction of movement of the cleaner is reversed. One such plate 40 is mounted under the channel 33 to be operative in one direction of motion of the cleaner tank, while a similar inclined plate 41 is mounted under the channel 35 to come into operation when the direction of motion of the cleaner tank is reversed.

As shown in Fig. 3, each of the inclined plates 40 and 41 may be constructed of a strip of perforated sheet metal bent between its forward and rear edges as at 42 to provide a forward elevating surface 43 and a rear overhanging surface 44. The plate is attached at 42 to a member 45 which serves the dual purpose of an axle and an air inlet pipe for introducing air under the plate.

Around the air inlet pipe 45 is fitted a sleeve 47 to which is welded at spaced points a plurality of triangular braces 48. The sleeve 47 has a plurality of aligned slots 50 which are in registry with corresponding slots 51 in the pipe 45 when the plow is in operative position. When the plow has moved upwardly to the position shown in the dotted lines of Fig. 3, the slots do not register and the supply of air is cut off. The plow itself is welded to the sleeve 47 along the portion 42 and is also provided with bottom braces 52 welded to the lower part of the sleeve 47.

Both the forward surface 43 and the rear surface 44 of the plows are provided with sets of perforations 54 and 55 respectively for the purpose of injecting compressed air into the upper layer of sand which is separated when the plow is in operation. This air is supplied through the pipes 45 by means of air conduits 56 which are connected to a motor driven air compressor 57.

In the modification of Fig. 1 a second independent sand agitating device is shown which is adapted to operate in conjunction with a filter bed of magnetic material such as magnetite sand or the like. This agitator consists of an electromagnet 60, in the form of a solenoid having a hollow core 61, which electromagnet is mounted in the chamber 24 formed between the partition 22 and the intermediate partition 23. The electromagnet is intermittently energized and deenergized by means of an automatically timed switch of the type shown in my copending application above referred to, and this switch is designed to begin operation only when the liquid in the filter canal 2 has reached a height which indicates that the filter bed has become clogged with impurities. It will thus be seen that the electromagnetic agitator 60 is designed to cooperate with the plows 40 and 41 to provide a supplemental and more thorough agitation and cleaning of the filter bed whenever this is necessary.

The electromagnetic agitator or solenoid 60 is known per se, and is described and claimed herein only insofar as it cooperates with the pneumatic cleaner of the present invention. Briefly, the solenoid 60 operates when a direct current or alternating current of low frequency is passed through it to produce a zone of agitation in the filter bed by attracting and lifting the sand of the filter. A stream of wash water is forced upwardly through this zone of agitation by the hydrostatic pressure existing by reason of the control weir 12. This wash water rises in the chamber 24 and flows over the weir plate 31 into the pump chamber 25, from which it is withdrawn by the wash water pump 65.

When the cleaner of Fig. 1 is in normal operation, one or the other of the plows 40 and 41 digs into the sand of the filter, depending upon the direction of travel of the cleaner, until it assumes an operative position, its depth of penetration being limited by the stops 70. In this position, it serves to separate the sand of the filter into upper and lower layers as the cleaner tank travels continuously or intermittently over the filter bed. Compressed air is continuously injected through the pipe 56 and 45 into the space beneath the plow 40 or 41, dependent upon which one is operative, from which space it is injected into the upper layer of sand through the perforations 54 and 55.

Simultaneously, a stream of wash water is forced upwardly through the thin layer of sand 71 below the plow by the hydrostatic pressure of the effluent channel 11. This wash water becomes mixed with the compressed air and the mixture of air and wash water passes upwardly through the upper layer of sand, thereby removing dirt and impurities from it. The stream of wash water passes upwardly through the inlet passage 34 or 36, from which it is discharged over the adjustable weir 30 or 29 into the pump chamber 25. The pump 65 is preferably in continuous operation and discharges the wash water into an effluent channel such as the channel 72 shown on Fig. 2. From this channel it is returned to a sedimentation tank in conjunction with which the filter is operated, or is removed for separate treatment with chemicals.

The combination of pneumatic and hydrostatic cleaning which has just been described will serve to keep the filter bed clean under normal operating conditions. Occasionally, however, when a more thorough and drastic cleaning of the filter bed is desirable, as indicated by an excessive rise of the liquid level in the filter canal 2, the solenoid 60 comes into operation, as has been described. This combined action of pneumatic cleaning with intermittent electromagnetic agitation constitutes another feature of the invention.

In Fig. 5 I have shown a cleaner tank equipped with pneumatic cleaners of the type described, but without electromagnetic agitation. This type of cleaner may be used for the filtration of drinking water, boiler feed water and similar types of water in which no unusually large amounts of impurities are found. Its structure and operation are identical with the above described portions of Fig. 1, as indicated by the same reference numerals.

Although certain specific embodiments of the invention have been described, and although the invention has been illustrated as applied to certain specific types of cleaning mechanisms it is understood that the principles of the invention may be applied to cleaning mechanisms of any known or approved type, and that any reasonable modifications or equivalents thereof may be used which fall within the scope of the subjoined claims.

I claim:

1. A traveling cleaner for sand filters comprising in combination a cleaner caisson adapted to move over successive portions of the filter bed and collect wash water therefrom, an inclined perforated plate under said caisson adapted to travel within the sand of the filter and elevate an upper layer thereof, and means for injecting a fluid through the plate perforations and creating a zone of agitation on the layer so elevated.

2. A filter comprising in combination a horizontal filter bed of sand, a source of hydrostatic pressure exerted on the bottom of said filter bed, a cleaner caisson adapted to move over the top of said filter bed and collect wash water therefrom, means for elevating an upper layer of the sand of the filter under said caisson without disturbing the filter bed beneath said layer and means for injecting air through the elevating means and into said upper layer of sand.

3. A filter comprising in combination a horizontal filter bed of sand, a source of hydrostatic pressure exerted on the bottom of said filter bed and adapted to force wash water therethrough, a cleaner caisson adapted to move over the top of the filter bed and collect said wash water, a hollow inclined plate under said caisson adapted to travel within the sand of the filter and elevate an upper layer thereof, and means for injecting air from within the plate into the layer of sand so elevated.

4. A filter comprising in combination a horizontal filter bed of sand, a source of hydrostatic pressure exerted on the bottom of said filter bed and adapted to force wash water therethrough, a cleaner caisson adapted to move over the top of said filter bed, a chamber in said caisson having an overflow weir, means for withdrawing water from said chamber, a water inlet passage for conducting wash water from the surface of said filter to said weir, means for elevating an upper layer of the sand of the filter under said passage and means for injecting air through the elevating means and into said upper layer of sand.

5. A traveling filter bed cleaning device adapted for cleaning the bed of a downward-flow filter liquids in which the downward-flow is produced by a difference in head at opposite sides of said bed, comprising a chamber with an open bottom adjacent the upper surface of said bed, means for traveling with said chamber and extending downwardly therefrom into the filter bed to agitate the same and introduce compressed air to cause an upward flow of air, accumulated solids and liquid, means for removing excess air from the chamber, and means for withdrawing solids and accompanying liquid.

6. The method of cleaning a filter bed in use for downward filtration of liquid in which the downward-flow is produced by a difference in head at opposite sides of said bed which comprises maintaining a fixed area of the filter bed isolated from the main body of the liquid above the filter, varying the position of this area over the filter bed to advance the cleaning of the filter bed, agitating from above the filter bed at the area under treatment and introducing compressed air into the filter bed in said area to release and lift the accumulated solids and accompanying liquid, removing the excess air from the mixture thus lifted, and removing the resulting solids and accompanying liquid to a point remote from the filter.

CHARLES E. FRASER.

REFERENCES CITED

The following references are of record in the file of this patent:

UNITED STATES PATENTS

| Number | Name | Date |
| --- | --- | --- |
| 595,182 | Lardner et al. | Dec. 7, 1897 |
| 873,010 | Blaisdell | Dec. 10, 1907 |
| 1,393,492 | Brooks | Oct. 11, 1921 |
| 1,748,898 | Peebles | Feb. 25, 1930 |
| 1,872,759 | Laughlin et al. | Aug. 23, 1932 |
| 1,919,567 | Laughlin et al. | July 25, 1933 |